United States Patent [19]

Kellström

[11] Patent Number: 5,435,653
[45] Date of Patent: Jul. 25, 1995

[54] SEALED BEARING

[75] Inventor: Magnus Kellström, Partille, Sweden
[73] Assignee: AB SKF, Goteborg, Sweden
[21] Appl. No.: 296,606
[22] Filed: Aug. 29, 1994

[30] Foreign Application Priority Data

Oct. 11, 1993 [SE] Sweden .................... 9303312

[51] Int. Cl.⁶ .................... F16C 33/72; F16C 23/08
[52] U.S. Cl. .................... 384/484; 384/558
[58] Field of Search ............ 384/558, 568, 477, 481, 384/482, 484, 485, 486, 560, 551, 505, 572, 470

[56] References Cited

U.S. PATENT DOCUMENTS

| | | | |
|---|---|---|---|
| 2,767,037 | 10/1956 | Williams | 384/558 X |
| 3,113,812 | 12/1963 | Dotter | 384/484 |
| 3,366,428 | 1/1968 | Smith | 384/482 |
| 4,705,411 | 11/1987 | Kellström | 384/450 |
| 5,002,406 | 3/1991 | Morton et al. | 384/558 X |
| 5,119,446 | 6/1992 | Grafström et al. | 384/477 X |

FOREIGN PATENT DOCUMENTS 1905766 8/1970 Germany .
354329 3/1973 Sweden .

Primary Examiner—Thomas R. Hannon
Attorney, Agent, or Firm—Burns, Doane, Swecker & Mathis

[57] ABSTRACT

Bearing (14) of the type having a full complement of rollers incorporating an inner race ring (13), an outer race ring (14) and a row of rollers (15) provided between these rings, said rollers being axially moveable relative to the rings. The space between inner race ring (13) and outer race ring (14) is sealed off by means of sealing members (18) arranged on one hand to provide a sealing effect by frictional engagement against the inner race ring as well as against the outer race ring, and on the other hand to follow the rollers (15) in their axial movement.

6 Claims, 2 Drawing Sheets

SEALED BEARING

BACKGROUND OF THE INVENTION

The present invention refers to a sealed bearing incorporating an inner race ring with an inner race, an outer race ring with an outer race, a row of elongated rollers provided between and engaging the races, whereby the races and the rollers have curved longitudinal section profiles and which rollers, without obstruction from annular flanges at the races, are axially moveable between the races relative thereto for allowing mutual misalignment of the races, and sealing members for sealing off the space between the inner race ring and the outer race ring.

A purpose of the present invention is to provide a sealed bearing, wherein the increase of the overall width of the bearing required for the sealing arrangement is kept as small as possible.

Another purpose of the invention is to try to maintain the sealing capacity of the sealing member in as far as possible upon axial displacement between the inner race ring and outer race ring, and upon misalignment of the inner race ring relative to the outer race ring.

SUMMARY OF THE INVENTION

These purposes have been obtained by a sealed, cage-free bearing comprising inner and outer race rings forming inner and outer races, respectively. An annular row of longitudinally elongated, circumferentially adjacent rollers disposed in a space formed between the inner and outer races and engaging both of the inner and outer races. Each of the rollers has longitudinally spaced first and second ends and a generally convex outer surface as viewed in longitudinal section. Each of the inner and outer races is generally concave as viewed in longitudinal section. The rollers are longitudinally movable relative to the inner and outer races for permitting misalignment between the races. First and second longitudinally spaced sealing members are disposed in the space for sealing opposite sides thereof. The first sealing member is disposed adjacent the first ends of the rollers, and the second sealing member is disposed adjacent the second ends of the rollers. Each of the sealing members includes radially spaced inner and outer edges frictionally engaging the inner and outer races, respectively. Each sealing member is displaceable longitudinally relative to both of the inner and outer races while maintaining frictional sealing engagement therewith.

BRIEF DESCRIPTION OF THE DRAWINGS

Hereinafter the invention will be described in detail with reference to the accompanying drawings. The embodiment shown in these drawings is intended only to exemplify the invention within the scope of the claims.

In the drawings

DETAILED DESCRIPTION OF THE PREFERRED EMBODIMENT

Figure 1:
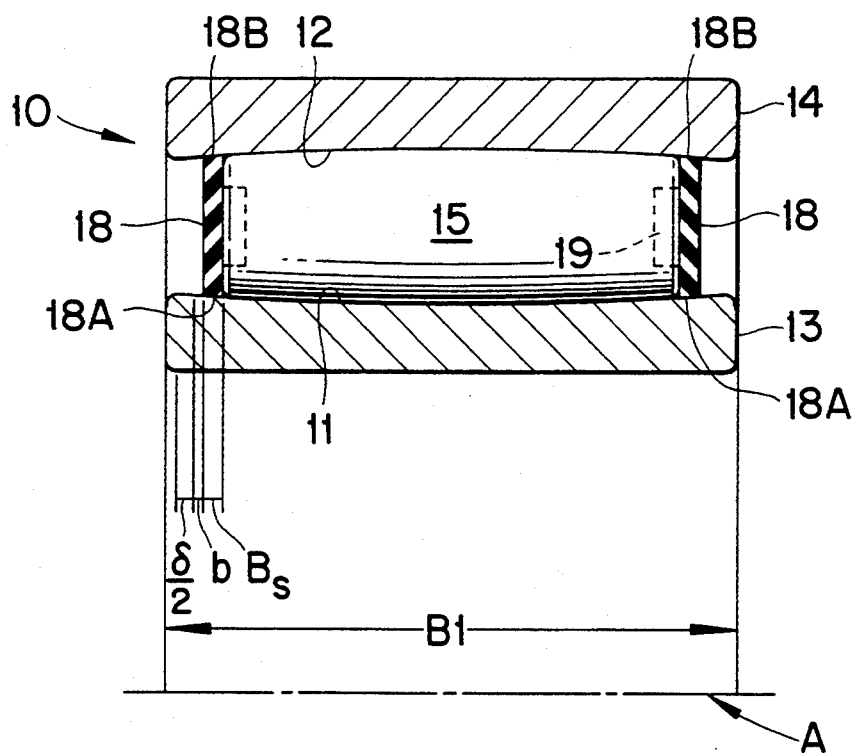
FIG. 1 shows an axial section through a bearing in accordance with the invention.
Figure 3:
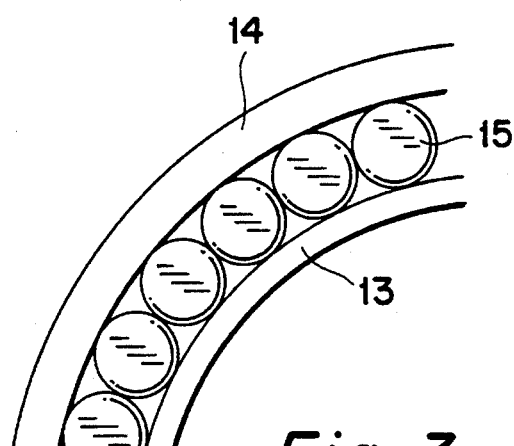
FIG. 3 illustrates diagramatically a partial side view of a bearing having conventional full complement of rollers and with the seal removed.

In the bearing designated 10 in FIG. 1, the races 11, 12 on the inner race ring 13 and the outer race ring 14 respectively, are each shaped with concave profile. The elongated rollers 15 provided between the races 11, 12 are axially displaceable between the races along longitudinal axis A without obstruction from annular flanges at the races in order to allow mutual misalignment between the inner race ring 13 and the outer race ring 14. As can be seen from FIG. 3 the bearing is designed as a bearing having a full complement of rollers, i.e. without any cage.

The bearing is designed such as shown and described in U.S. Pat. No. 4,705,411 and therefore this publication is incorporated by reference in the present specification.

The bearing 10 could be provided with sealing members a of a conventional type, i.e. sealing elements 16 in the form of a lip seal fitted to either of the race rings 13, 14 and sealing off against the other ring. For example, the lip seal 16 could be fitted and arranged to seal off against the inner race ring 13, such as shown in FIG. 2.

Figure 2:
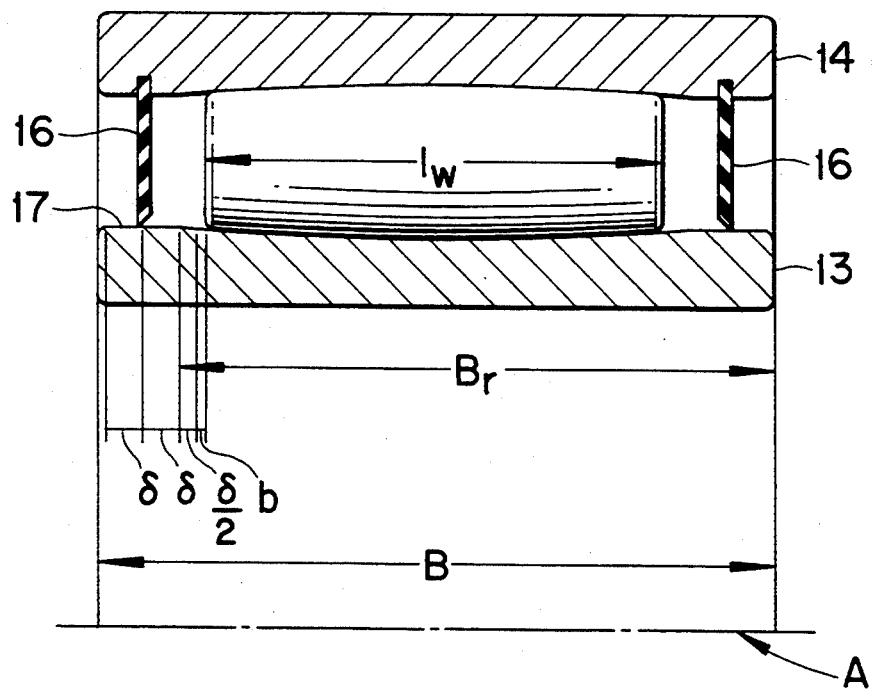
FIG. 2 is an axial section through a conventional bearing.

In FIG. 2:

$l_w$ = the width of the roller, $\delta$ = the relative axial displacement between inner race ring and outer race ring, and b = the axial displacement of the roller at misalignment of the inner race ring in relation to the outer race ring.

As can be seen from FIG. 2 the required width of the sealing surface 17 at each side of each sealing element 16 will be $\delta$ in order to enable each sealing element to be displaced either to the right or left, for a total of 4 $\delta$.

The width $B_r$ of the race 11 must be bigger than the width $l_w$ of the roller 15, if the roller shall be completely accommodated between the races 11, 12. If one of the rings 13, 14 is displaced axially $\delta$ relative to the other, the roller 15 will be displaced $\delta/2$ relative to each race. Furthermore the roller will be displaced a distance b at possible misalignment of the inner race ring relative to the outer race ring.

The overall width of the bearing thus will be $$B = l_w + 4\delta + 2(\delta/2 + b) = l_w + 5\delta + 2b$$

Upon a relative axial displacement between inner race-ring and outer race ring a distance $\pm \delta$, it is necessary that the sealing element 16 moves the distance $2\delta$ relative to the inner race ring 13. This required long motion is higly disadvantageous with respect to the sealing ability of the sealing element 16. Upon misalignment of the inner race ring relative to the outer race ring, distance between the sealing surfaces 17 changes, so it is necessary that the sealing lip of the element 16 yields (bends) which furthermore reduces the sealing ability of the sealing element.

In accordance with the invention the sealing member 18 is arranged to provide a sealing effect by having its inner and outer edges 18A, 18B disposed in frictional engagement with the inner and outer races 11, 12, respectively (race 11 as well as against the outer race 12). This means that the sealing element 18 will be carried along by the end surface of the roller and therefore follow the roller 15 in its axial movement. The required width $B_1$ of the bearing thus will be the width $B_r$ of the race in accordance with the above + the thickness $B_s$ of the sealing member 18, i.e.

$$B_1 = l_w + 2(\delta/2 + b) + 2B_s = l_w + \delta + 2b + 2B_s$$

The reduction of the required bearing width, $B-B_1$, gained by means of an embodiment according to the present invention will consequently be 4 δ−2 B$_s$. Upon relative axial movement between the race rings, each sealing member need travel a distance equal only to the axial movement of the roller relative to each race ring.

The required movement of the sealing member 18 thus is strongly reduced as compared to the embodiment shown in FIG. 2, and this improves its sealing ability. Upon misalignment of the inner race ring 13 in relation to the outer race ring 14 the distance between the races 11, 12 is maintained constant, i.e. the height of the sealing member 18 is maintained constant, which means that the sealing force of the sealing member 18 is kept unaltered. Upon the abovementioned misalignment the radially opposed rollers will be displaced relative to each other, which results in a necessity to extend the sealing member 18 somewhat. This is made possible in that the sealing member is formed entirely flexible, e.g. by being made from rubber.

Upon a bearing according to the present invention the sealing member 18 will follow the rollers 15 in their axial movement. This is effected in that the normal force between the sealing member 18 and each one of the races 11, 12 has a component urging the sealing member against the end surface of the rollers 15. If the friction between the sealing member 18 and the races 11, 12 is low, which is the case if the sealing member rotates relative to the races, the sealing member will always be pressed against the roller end.

The sealing member 18 is mounted between the races 11, 12 during squeezing, whereby will have an inherent force produced during the mounting, which urges the seal against the ends of the set of rollers independent of relative movement between the inner and outer race rings.

As mentioned above the sealing member 18 will yield somewhat upon misalignment of the inner race ring relative to the outer race ring, i.e. when the rollers are displaced axially relative to each other. The expansion of the sealing member 18 caused thereby means that there is produced an inherent force which tends to regain the initial shape of the sealing member and thereby tries to move the sealing member back against the end of the roller if the sealing member should move away from that roller end.

Tests have shown that the two abovementioned factors, i.e. the influence of the normal force and the inherent force of the sealing member, are normally sufficient for ascertaining that the sealing member 18 follows the rollers during their axial movement. If the rotation of the sealing member relative to the races should cease temporarily the friction between the sealing member and races will increase, whereby the force required for pushing the sealing member against the roller end increases. Desired rotation of the sealing member can be ascertained if the sealing members is provided with carrier means adapted to cooperate in a proper manner with the rollers 15 so that the sealing member 18 is carried along by the rollers 15 during rotation of the bearing. According to one embodiment, the carrier means 19 can be arranged to engage in the interspace between two adjacent roller 15.

I claim:

1. A sealed cage-free bearing defining a longitudinal axis and comprising:
   an inner race ring forming an inner race,
   an outer race ring forming an outer race,
   an annular row of longitudinally elongated, circumferentially adjacent rollers disposed in a space formed between said inner and outer races and engaging both of said inner and outer races,
   each of said rollers having longitudinally spaced first and second ends, and each of said rollers having a generally convex outer surface as viewed in longitudinal section,
   each of said inner and outer races being generally concave as viewed in longitudinal section,
   said rollers being longitudinally movable relative to said inner and outer races for permitting misalignment between said races; and
   first and second longitudinally spaced sealing members disposed in said space for sealing opposite sides thereof,
   said first sealing member disposed adjacent said first ends of said rollers, and said second sealing member disposed adjacent said second ends of said rollers,
   each of said sealing members including radially spaced inner and outer edges frictionally engaging said inner and outer races, respectively,
   each sealing member being displaceable longitudinally relative to both of said inner and outer races while maintaining frictional sealing engagement therewith.

2. The bearing according to claim 1, wherein each sealing member is inherently urged against a respective end of said row of rollers so as to be circumferentially rotated about an axis of said bearing in response to circumferential movement of said rollers.

3. The bearing according to claims 2, wherein each sealing member includes a longitudinally inwardly extending portion arranged to be contacted by said rollers and circumferentially rotated thereby about said axis.

4. The bearing according to claim 1, wherein each sealing member includes a longitudinally inwardly extending portion arranged to be contacted by said rollers and circumferentially rotated thereby about said axis.

5. The bearing according to claim 4, wherein the longitudinally inwardly extending portion extends circumferentially between successive rollers.

6. The bearing according to claim 1, wherein said sealing members are formed of an elastically flexible material.

* * * * *